(12) United States Patent
Okamitsu

(10) Patent No.: US 6,833,154 B2
(45) Date of Patent: Dec. 21, 2004

(54) METHOD FOR OPTIMIZATION OF RADIANT CURING OF SURFACE COATINGS ON THREE-DIMENSIONAL OBJECTS

(75) Inventor: Jeffrey K. Okamitsu, Westminster, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 63 days.

(21) Appl. No.: 10/382,878

(22) Filed: Mar. 7, 2003

(65) Prior Publication Data

US 2003/0230831 A1 Dec. 18, 2003

Related U.S. Application Data

(60) Provisional application No. 60/363,252, filed on Mar. 12, 2002.

(51) Int. Cl.[7] .................................................. B05D 3/14
(52) U.S. Cl. ..................... 427/8; 427/385.5; 427/521; 427/556; 427/557; 427/595
(58) Field of Search .......................... 427/8, 385.5, 521, 427/556, 557, 595

(56) References Cited

U.S. PATENT DOCUMENTS

| | | |
|---|---|---|
| 4,208,587 A | 6/1980 | Eastlund et al. |
| 4,820,365 A | 4/1989 | Brumm et al. |
| 5,164,128 A | 11/1992 | Modrek et al. |
| 6,013,911 A | 1/2000 | Hibbard et al. |
| 6,149,856 A | 11/2000 | Zemel et al. |
| 6,174,932 B1 | 1/2001 | Pachl et al. |

FOREIGN PATENT DOCUMENTS

JP          10-24495          1/1998

OTHER PUBLICATIONS

R. W. Stowe, "Practical Aspects of Irradiance and Dose in UV Curing", RadTech 98, Chicago, Apr. 19–22, 1998, pp. 640–645, Chicago, TadTech International Naorth America, Northbrook, IL 1998, pp. 640–645.

Mathias Schneider et al, "Optimized Positioning of UV Lamps for the Treatment of 3D Workpieces", RadTech Europe 99, Nov. 8–10, 1999, Brlin RadTech Europe, Nyon, Schweiz, 1999, pp. 711–716, no month avail.

*Primary Examiner*—Bernard Pianalto
(74) *Attorney, Agent, or Firm*—Antonelli, Terry, Stout & Kraus, LLP

(57) ABSTRACT

The invention is a process for radiant curing of a coating on a three-dimensional object. The process includes (a) providing a model of a radiant output of at least two lamps to be used to provide the radiant curing of the coating; (b) providing a model of at least one characteristic of a response of the coating to radiant curing; (c) selecting radiant output of the lamps based upon the model of the radiant output; and (d) defining at least a spatial position of the lamps during curing of the coating; (e) defining at least a spatial position of the three-dimensional object during curing of the coating; (f) simulating a radiant output of the at least two lamps based upon the defined spatial position of the lamps; (g) in response to the simulated radiant output and the defined spatial position of the three-dimensional object during curing of the coating, determining if a predicted radiant output of the at least two lamps on the three-dimensional object will acceptably cure the three-dimensional object; and (h) if the radiant output is acceptable, storing a number of the lamps, position of the lamps used in the model of the radiant output, the selected radiant output, and the defined position of the three-dimensional object.

14 Claims, 1 Drawing Sheet

METHOD FOR OPTIMIZATION OF RADIANT CURING OF SURFACE COATINGS ON THREE-DIMENSIONAL OBJECTS

CROSS REFERENCE TO RELATED APPLICATION

This application claims the benefit of the filing date of Provisional Patent Application Ser. No. 60/363,252 filed on Mar. 12, 2002, entitled "Method for Optimization of Radiant Curing of Surface Coatings on Three-Dimensional Objects", which application is incorporated herein by reference in its entirety.

BACKGROUND OF THE INVENTION

1. Field of the Invention

The invention relates to the optimization of radiant curing of surface coatings on three-dimensional objects and, more particularly, to ultraviolet (UV) curing of surface coatings on three-dimensional objects.

2. Description of the Prior Art

The current methodology for the optimization of UV curing of surface coatings on three-dimensional complex objects using adjustable UV lamps or systems of lamps and reflectors is a complex process usually performed by trial and error guided by heuristic techniques. Such an optimization process is time consuming and is a mistake prone activity. Even when the heuristic optimization results in satisfying minimum curing requirements, the optimization does not provide for an unambiguous curing process specification and yields no information for process control and sensitivity analysis. Consequently, the extensive efforts required for the current state of the art's optimization of UV curing processes of surface coatings on complex three-dimensional objects generally produces sub-optimal performance, wastes time, space an energy and results in low and unpredictable quality.

The problems of optimization of the curing of surface coatings on three-dimensional objects are known and routinely encountered in applications. The partial solutions for particular aspects of the general problem are extensively discussed. See R. Stowe, "Practical Aspects of Irradiance and Dose and UV Curing", RadTech 98, Chicago, Apr. 19–22, 1998, pp. 640–645, Chicago, RadTech International North America, Northbrook, II 1998. Furthermore, the publication "Optimized Positioning of UV Lamps for the Treatment 3D Workpieces" by Schneider M., Klein W., & Schröder C., "RadTech Europe 99", Nov. 8–10, 1999, Berlin RadTech Europe, Nyon, Schweiz, 1999, pages 711–716, describes an attempt to optimize UV curing.

SUMMARY OF THE INVENTION

The present invention is a process which provides a systematic approach to the optimization of irradiation and preferably, UV curing of surface coatings on complex 3D objects. The invention avoids the deficiencies and expenses of the prior art ad hoc process of optimization as described above. The present invention is not limited by size and geometry of the lamps, 3D objects and relative positions thereof. The process of the present invention is more time efficient, simultaneously optimizes radiant illumination and radiant chemistry and naturally yields process production design and control parameters. The invention may be utilized with respect to diverse products and applications where treatment of surface coatings on complex 3D geometries of objects is required.

A process for irradiation curing of a coating on a three-dimensional object in accordance with the invention includes (a) providing a model of a radiant output of at least two lamps to be used to provide the irradiation curing of the coating; (b) providing a model of at least one characteristic of a response of the surface to irradiation curing; (c) selecting a radiant output of lamps based upon the model of the radiant output; (d) defining at least a spatial position of the lamps during curing of the coating; (e) defining at least a spatial position of the three-dimensional object during curing of the coating; (f) simulating a radiant output of the at least two lamps based upon the defined spatial position of the lamps; (g) in response to the simulated radiant output and the defined spatial position of the three-dimensional object during curing of the coating, determining if a predicted irradiation from at least two lamps on the coating coated on the three-dimensional object will acceptably cure the coating on the three-dimensional object; and (h) if the radiant output is acceptable, storing a number of the lamps used in the model of the radiant output, the defined position of the lamps used in the model of the radiant output, the selected radiant output, and the defined position of the three-dimensional object. If the radiant output is not acceptable, changing at least one parameter of the process and repeating steps (c)–(h) may be repeated using a new parameter set. The at least one parameter may be the new number of lamps to be selected and thereafter repeating steps (c)–(h). The at least one process parameter may define motion of the lamps during curing of the surface coating and may define motion of the three-dimensional object during curing of the surface coating; and steps (c)–(h) may be repeated. A curing facility having the stored number of lamps, the stored radiance, the stored lamp position and the stored position of the three-dimensional object stored at step (h), may be fabricated and thereafter, used to cure of the surface coating disposed on the three-dimensional object.

DETAILED DESCRIPTION OF THE INVENTION

Figure 1:
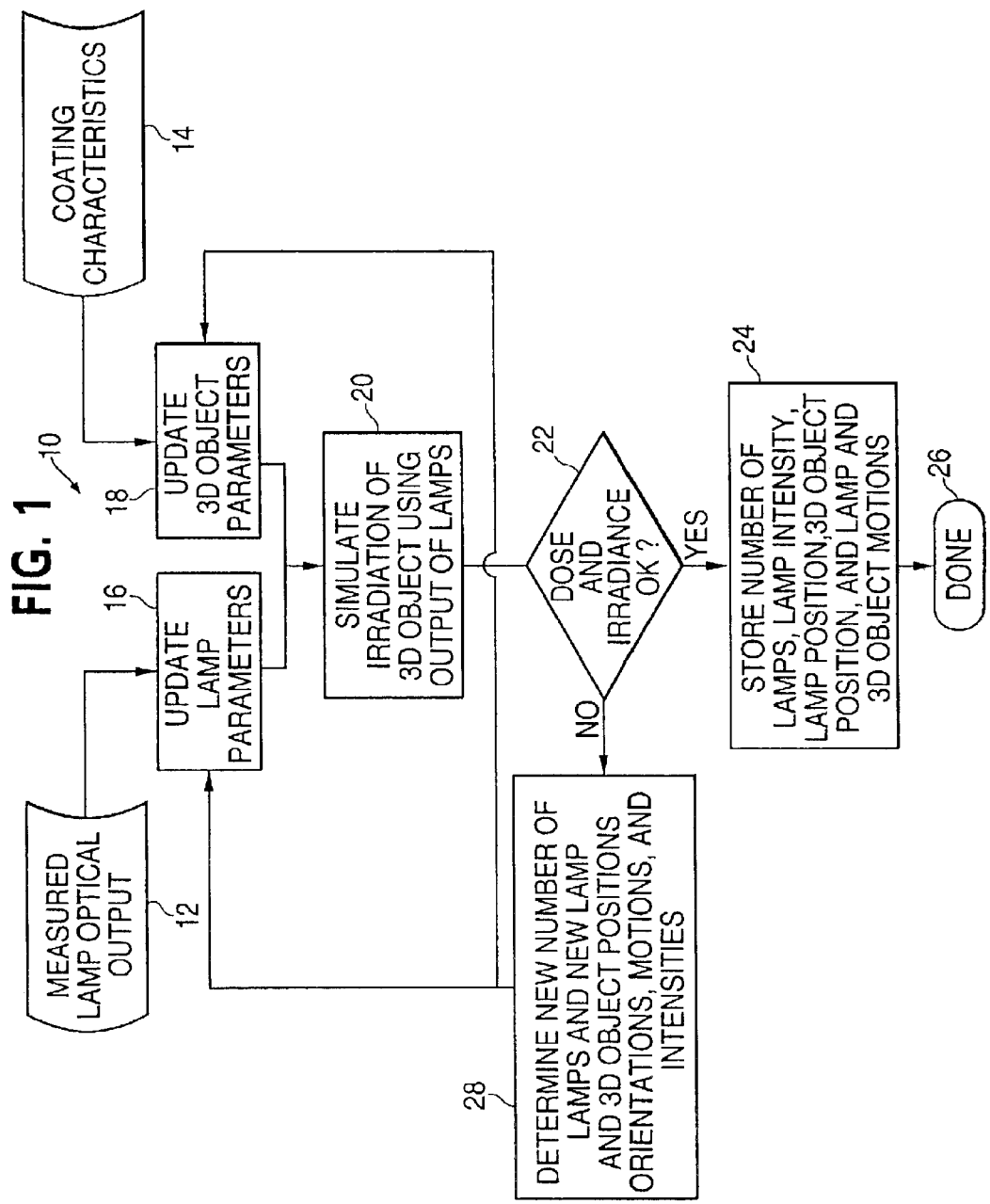
FIG. 1 illustrates a flowchart of the process of the present invention.

FIG. 1 illustrates a flowchart of the process of the present invention. The process provides a methodology for simulating the irradiation curing process of a complex three-dimensional object which has a preferred application for UV curing of UV activated surface coatings on complex 3D objects. The lamps and coating materials utilized in the present invention are well known and do not form part of the present invention.

The present invention utilizes mathematical models of steps used in the simulation of the curing process and thereafter, a simulated process is run using the mathematical models to determine if the radiant output in terms of dose and irradiance is acceptable for curing the three-dimensional object which has been coated with a surface coating which is preferably a UV activated surface coating.

As starting points, the process 10 utilizes a lamp optical output model 12 and a coating characteristic model 14. The lamp optical output 12 is a data set of measured spectraradiometric data for the lamp system that is modeled as part of the process simulation. Such measurements can be made by using commercially available spectraradiometric devices. The data consists of the spectral irradiance at various points in space that are illuminated by each of the lamps. For example, each lamp can be placed at a fixed point in space and the measurement device can be moved to the various grid points on a plane that is perpendicular to the primary direction of the light emission to the lamp and at a fixed distance from the lamp. Also, irradiance data is taken at various different lamp power levels. A separate data set exists for each type of UV lamp used in the simulation where the simulation requires a plurality of different lamps. The coating characteristic model 14 uses data that defines the range (maximum to minimum) of light irradiance (Watts per square meter) and dose (Joules per square meter) that are required to properly polymerize, cure, treat, modify or otherwise process the coating that is placed on the three-dimensional object. This data is treated as input data to the simulation along with the lamp optical output 12.

The updated lamp parameters step 16 uses the output versus lamp power level data so that the simulated output of each lamp is set either to a present initial power level or at a level that is determined by the process of the present invention as described below. The data is used to select the proper lamp input data setting (or to predict using, for example, some form of interpolation method) for subsequent modeling of the optical output of each lamp or uses the result of variation of the number of lamps, the type of lamps, three-dimensional object position, orientation, motion and intensities to select a new power level for the lamp which is then used to select (or predict) the proper lamp input data set.

The updated lamp parameters step 16 positions lamps and sets up lamp motion which uses either a set of preset numbers of lamps, positions of each lamp and motions for each lamp in the simulation (for example, at the beginning of the simulation) or uses the result of a new number of lamps and intensities. Each lamp is positioned in terms of "x", "y" and "z" coordinate positions, with a set angular orientation. At a new starting position in simulation space the required motion of each lamp is stored for subsequent use in calculating the dose and irradiance imparted to the 3D object. The positioning of lamps and setup of lamp motion of step 16 simulates the physical placement and motion of the lamps, simulates physical boundaries and where the lamps are not allowed to cross, regions of space where the lamp cannot be positioned because of other constraints and considers possible limitations on the speed and acceleration of each lamp.

The update 3D object parameter step 18, is responsive to the coating characteristics 14 and positions the 3D object and sets up motion of the 3D object based upon the 3D object being modeled as a set of surfaces in simulation space. For example, a set of surfaces that are produced by a commercially available computer aided drafting (CAD) software program may be used. The 3D object is either pre-positioned (for example, at the start of the simulation) and assigned a predetermined motion or positioned in terms of "x", "y" and "z" and angular orientations at a position in space in a manner similar to the positioning of the lamps at step 16 and is assigned a new motion that is given by the results of any previous optimization in determining a new number of lamps and/or modification of intensity at step 16.

The simulation of irradiation of 3D object output of lamps of step 20 uses as input data the new lamp positions and motion of step 16 and the positions and motions of the 3D object of step 18. The collective output of all the lamps in the simulation of step 20 are simulated by using a mathematical algorithm that attempts to model the geometric and physical optics of the lamps. For example, an algorithm may be employed that traces rays of light from each point on the emitting surface of the lamp to each point in space, the constraint being that the propagation of rays of light are governed by the laws of physics. Step 20 takes into consideration the motion of each lamp during calculation of the irradiance field emitted by the collective output of the plurality of lamps in the system.

The process 10 proceeds from the simulated irradiation of the 3D object using output of lamps at step 20 to decision point 22 where a determination is made if the dose and irradiance is acceptable for curing the surface coating modeled at step 14 on the three-dimensional object. At step 22, with the lamp output levels set, the lamps positioned, lamp motion defined and the 3D object positioned, and motion thereof defined, the same algorithm used for modeling the collective optical output of the plurality of lamps now calculates the maximum and minimum irradiance of light from the collective influence of the plurality of lamps imparted to the surface of the 3D object taking into consideration the fact that some or all of the lamps are moving and the 3D object is moving. This is accomplished, as stated above, by using the same type of optical modeling algorithm originally employed in defining the lamp optical output 12 but instead, calculating the radiance of light imparted to the part at each point on the surface of the three-dimensional object as the lamp and part motion and changes in positions are calculated. The irradiance profile (as a function of time) can be calculated and the maximum and minimum irradiance can then be calculated. The irradiance calculation is performed for each different wavelength that is representative of the spectral output of the lamps that are simulated.

At the same time, the total dose (defined to be the integral over time of the irradiance) at each point on the 3D object and at each wavelength is also calculated.

Then, at step 22 the calculated dose and maximum and minimum irradiance at each point on the three-dimensional object is at each wavelength compared to the coating characteristics at step 14. If any point on the 3D object does not meet the requirement of the coating, then the step 22 has not been completed successfully. Conversely, if all points on the 3D object meet the requirements of the coating, the output of the dose and irradiance determination at step 22 proceeds to step 24 where the number of lamps, lamp intensity, lamp position, 3D object position and lamp and 3D object motions are stored as the actual process conditions to be used in physically curing the three-dimensional objects in a real process. The process proceeds from step 24 to end point 26.

If the dose and irradiance is not acceptable at step 22, the process proceeds to step 28 where, in view of the dose and irradiance at step 22 not being acceptable at step 22, a new number of lamps, lamp and 3D object positions, orientations, motions and intensities are determined at step 28. The new information at step 28 is used to update the processing at steps 16 and 18 and thereafter repeat the simulations step 20.

The foregoing steps 16, 18, 20, 22 and 28 are repeated in an iterative process to produce an acceptable output at step 22.

As stated above, after the iterative process is completed and optimization does occur where all points on the three-dimensional object are considered after simulation to be properly cured, the actual fabrication process is physically constructed by placement of lamps, object motion mechanisms, such as robots, etc. to actually practice the curing of the coated three-dimensional object with the surface coating which is preferably a UV coating using the parameters stored at step 24.

While the invention has been described in terms of its preferred embodiments, it should be understood that numerous modifications may be made without departing from the spirit and scope of the invention as defined in the appended claims. It is intended that all such modifications fall within the scope of the appended claims.

What is claimed is:

1. A process for irradiation curing of a coating on a three-dimensional object comprising:
   (a) providing a model of a radiant output of at least two lamps to be used to provide the radiant curing of the coating;
   (b) providing a model of at least one characteristic of a response of the coating to irradiation curing;
   (c) selecting radiant output of the lamps based upon the model of the radiant output;
   (d) defining at least a spatial position of the lamps during curing of the coating;
   (e) defining at least a spatial position of the three-dimensional object during curing of the coating;
   (f) simulating a radiant output of the at least two lamps based upon the defined spatial position of the lamps;
   (g) in response to the simulated radiant output and the defined spatial position of the three-dimensional object during curing of the coating, determining if a predicted irradiation from at least two lamps of the coating coated on the three-dimensional object will acceptably cure the three-dimensional object; and
   (h) if the radiant output is acceptable, storing a number of the lamps, position of the lamps used in the model of the radiant output, the selected radiant output, and the defined position of the three-dimensional object.

2. A process in accordance with claim 1 comprising:
   if the radiant output is not acceptable, changing at least one parameter of the process and repeating steps (c)–(h).

3. A process in accordance with claim 2 in wherein:
   the parameter is the new number of lamps and thereafter repeating steps (c)–(h).

4. A process in accordance with claim 3 wherein:
   at least one process parameter defines motion of the lamps during curing of the coating or defines motion of the three-dimensional object during curing of the coating; and
   repeating steps (c)–(h).

5. A process in accordance with claim 4 comprising:
   fabricating a curing facility having the stored number of lamps, the stored lamp radiance, the stored lamp position and the stored position of the three-dimensional object stored at step (h) and;
   thereafter curing the surface coating disposed on the three-dimensional object.

6. A process in accordance with claim 3 comprising:
   fabricating a curing facility having the stored number of lamps, the stored lamp radiance, the stored lamp position and the stored position of the three-dimensional object stored at step (h) and;
   thereafter curing the surface coating disposed on the three-dimensional object.

7. A process in accordance with claim 2 wherein:
   at least one process parameter defines motion of the lamps during curing of the surface coating or defines motion of the three-dimensional object during curing of the surface coating; and
   repeating steps (c)–(h).

8. A process in accordance with claim 7 comprising:
   fabricating a curing facility having the stored number of lamps, the stored lamp radiance, the stored lamp position and the stored position of the three-dimensional object stored at step (h) and;
   thereafter curing the surface coating disposed on the three-dimensional object.

9. A process in accordance with claim 2 comprising:
   fabricating a curing facility having the stored number of lamps, the stored lamp radiance, the stored lamp position and the stored position of the three-dimensional object stored at step (h) and;
   thereafter curing the surface coating disposed on the three-dimensional object.

10. A process in accordance with claim 1 comprising:
    defining motion of the lamps during curing of the surface coating; and
    defining motion of the three-dimensional object during curing of the surface coating; and
    repeating steps (c)–(h).

11. A process in accordance with claim 10 comprising:
    fabricating a curing facility having the stored number of lamps, the stored lamp radiance, the stored lamp position and the stored position of the three-dimensional object stored at step (h) and;
    thereafter curing the surface coating disposed on the three-dimensional object.

12. A process in accordance with claim 10 wherein:
    at least one process parameter defines motion of the lamps during curing of the surface coating or defines motion of the three-dimensional object during curing of the surface coating; and
    repeating steps (c)–(h).

13. A process in accordance with claim 12 comprising:
    fabricating a curing facility having the stored number of lamps, the stored lamp radiance, the stored lamp position and the stored position of the three-dimensional object stored at step (h) and;
    thereafter curing the surface coating disposed on the three-dimensional object.

14. A process in accordance with claim 1 comprising:
    fabricating a curing facility having the stored number of lamps, the stored lamp radiance, the stored lamp position and the stored position of the three-dimensional object stored at step (h) and;
    thereafter curing the surface coating disposed on the three-dimensional object.

* * * * *